(12) United States Patent
Yang et al.

(10) Patent No.: US 10,061,382 B2
(45) Date of Patent: Aug. 28, 2018

(54) PROGRAM, DEVICE, AND CALIBRATION METHOD FOR A CAMERA AND AN INERTIAL SENSOR

(71) Applicant: SEIKO EPSON CORPORATION, Tokyo (JP)

(72) Inventors: Yang Yang, Toronto (CA); Guoyi Fu, Vaughan (CA)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/612,293

(22) Filed: Jun. 2, 2017

(65) Prior Publication Data
US 2017/0371406 A1  Dec. 28, 2017

(30) Foreign Application Priority Data
Jun. 15, 2016 (JP) .................. 2016-118947

(51) Int. Cl.
*G06F 3/01* (2006.01)
*G06T 7/73* (2017.01)
*G02B 27/01* (2006.01)

(52) U.S. Cl.
CPC ......... *G06F 3/012* (2013.01); *G02B 27/0172* (2013.01); *G06T 7/74* (2017.01); *G02B 2027/014* (2013.01); *G02B 2027/0138* (2013.01); *G02B 2027/0178* (2013.01); *G06T 2207/30204* (2013.01); *G06T 2207/30244* (2013.01)

(58) Field of Classification Search
CPC ...... G01C 21/165; G01C 25/005; G06F 3/017
See application file for complete search history.

(56) References Cited

U.S. PATENT DOCUMENTS

2005/0232467 A1* 10/2005 Mohri ............... G06F 3/014
382/103
2014/0176418 A1* 6/2014 Ramachandran .... G01C 21/165
345/156

FOREIGN PATENT DOCUMENTS

JP  2005-038321 A  2/2005
JP  2007-213407 A  8/2007

OTHER PUBLICATIONS

Lobo, J. et al., "Relative Pose Calibration Between Visual and Inertial Sensors.", Proceedings of the ICRA 2005 Workshop on Integration of Vision and Intertial Sensors, 2nd InerVis, (2005).

* cited by examiner

*Primary Examiner* — Chun-Nan Lin
(74) *Attorney, Agent, or Firm* — Oliff PLC

(57) ABSTRACT

A method of calibration for a head-mounted display device including an camera, an inertial sensor and a processor causes the processor to realize functions of: acquiring a first image and a second image that are captured by imaging a first real marker with the camera when the inertial sensor is respectively at a first pose and a second pose; acquiring a difference in pose between the first pose and the second pose based on output of the inertial sensor; and deriving a spatial relationship between the camera and the inertial sensor based at least on the first image, the second image and the difference in pose.

5 Claims, 9 Drawing Sheets

PROGRAM, DEVICE, AND CALIBRATION METHOD FOR A CAMERA AND AN INERTIAL SENSOR

BACKGROUND

1. Technical Field

The present invention relates to calibration of a device.

2. Related Art

In recent years, technologies called augmented reality (AR) in which information is added to objects in real spaces by computers have been noticed. As one of the methods of realizing augmented reality, see-through display devices capable of seeing through the external world are known. JP-A-2007-213407 discloses a head-mounted display (HMD) as such a display device.

Hereafter, an HMD will be described as an example of a see-through display device. An HMD includes a tracking camera (imaging section) so that an AR function can be supplied. Then, the position of an actual object relative to the HMD (or the tracking camera) is detected and tracked through the tracking camera (tracking of an actual object by this scheme is referred to as "optical tracking"). The HMD displays a virtual object such as CG so that the position of the actual object can be tracked. At this time, a user views the virtual object so that the position of the virtual object can be associated with the position of the actual object.

The position and pose of an actual object in a view (angle of view) of a tracking camera are changed not only by a motion of the actual object but also by a motion (particularly, rotation) of the head of a user. In a case in which an angular velocity of rotation of the head is fast and/or an angle of the rotation is large, a time difference (delay time) until a change in the position or pose of the actual object is reflected in display of a virtual object is noticeable with only optical tracking in some cases.

Technically, it is easier to improve a resolution of an inertial sensor than a time resolution of a tracking camera (a frame rate of an image). Accordingly, as countermeasures of the delay time, it is considered to be effective that an HMD includes not only a tracking camera but also an inertial sensor, and the position and pose of an actual object relative to the HMD (a spatial position relationship between the actual object and the HMD) are estimated by the tracking camera and the inertial sensor.

As described above, in a case in which a tracking camera and an inertial sensor are cooperated to function as a "tracker (tracking device)", a coordinate system of the tracking camera and a coordinate system of the inertial sensor are preferably matched (calibrated). Even in a case other than the case in which a tracking camera and an inertial sensor are cooperated to function as a "tracker", for example, in a case in which a tracking camera and an image display section are calibrated on the basis of the eyes (retinas) of a user, it is useful to calibrate a coordinate system of the tracking camera and a coordinate system of the inertial sensor. A calibration method is preferably simple and a calibration result is preferably high precision.

Moreover, to fuse an IMU and an optical tracker in an HMD, IMU-camera calibration is necessary. An IMU-camera calibration method of using a gravity vector measured by an acceleration sensor and a vertical pattern for estimating rotation alignment of an inertial-virtual system has been proposed. This approach is static and has the advantage that a dynamic motion is not necessary. However, system setup is rather bothersome and easily causes an error. This system setup depends on a planar target with a vertical checker pattern. Factors necessary for the system setup have large loads on average users. Users necessarily ensure special positions at which there are special surfaces or vertical surfaces. Further, in data collected at different times, it is not ensured that reproducible precision is achieved.

SUMMARY

An advantage of some aspects of the invention is to solve the problems described above, and the invention can be implemented as the following forms or application examples.

An aspect of the invention is directed to a non-transitory storage medium containing program instructions that, when executed by a computer processor, cause the computer processor to perform a method acquiring a first image and a second image that are captured by imaging a real marker with a camera when an inertial sensor is respectively at a first pose and a second pose, the camera and the inertial sensor being included in a head-mounted display device; acquiring a difference in pose between the first pose and the second pose based on output of the inertial sensor; and deriving a spatial relationship between the camera and the inertial sensor using at least the first image, the second image and the difference in pose. According to this aspect of the invention, the spatial relationship between the camera and the inertial sensor can be derived in accordance with a change in the pose of the camera. Further, when the real marker at a static position is imaged, calibration can be performed. Therefore, compared to a case in which a dynamic real marker is imaged, there is no problem of time synchronization or the like and high precise calibration can be performed.

In the aspect of the invention, the head-mounted display device includes a first base portion and a second base portion, the camera is fixed with respect to the first base portion and the inertial sensor is fixed to the second base portion, so that at least one of the camera and the inertial sensor rotates with respect to one another.

(3) In the aspect of the invention, the head-mounted display device may further include a display section that displays an image, and wherein at least one of the camera and the display section is movable with respect to one another.

(4) The invention can be implemented in other various forms. For example, the invention can be implemented in the form of a non-transitory storage medium that stores the program. Alternatively, the invention can be implemented in the form of a calibration method in the foregoing order or a device (for example, an HMD, an imaging device, or a robot) that implements this method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
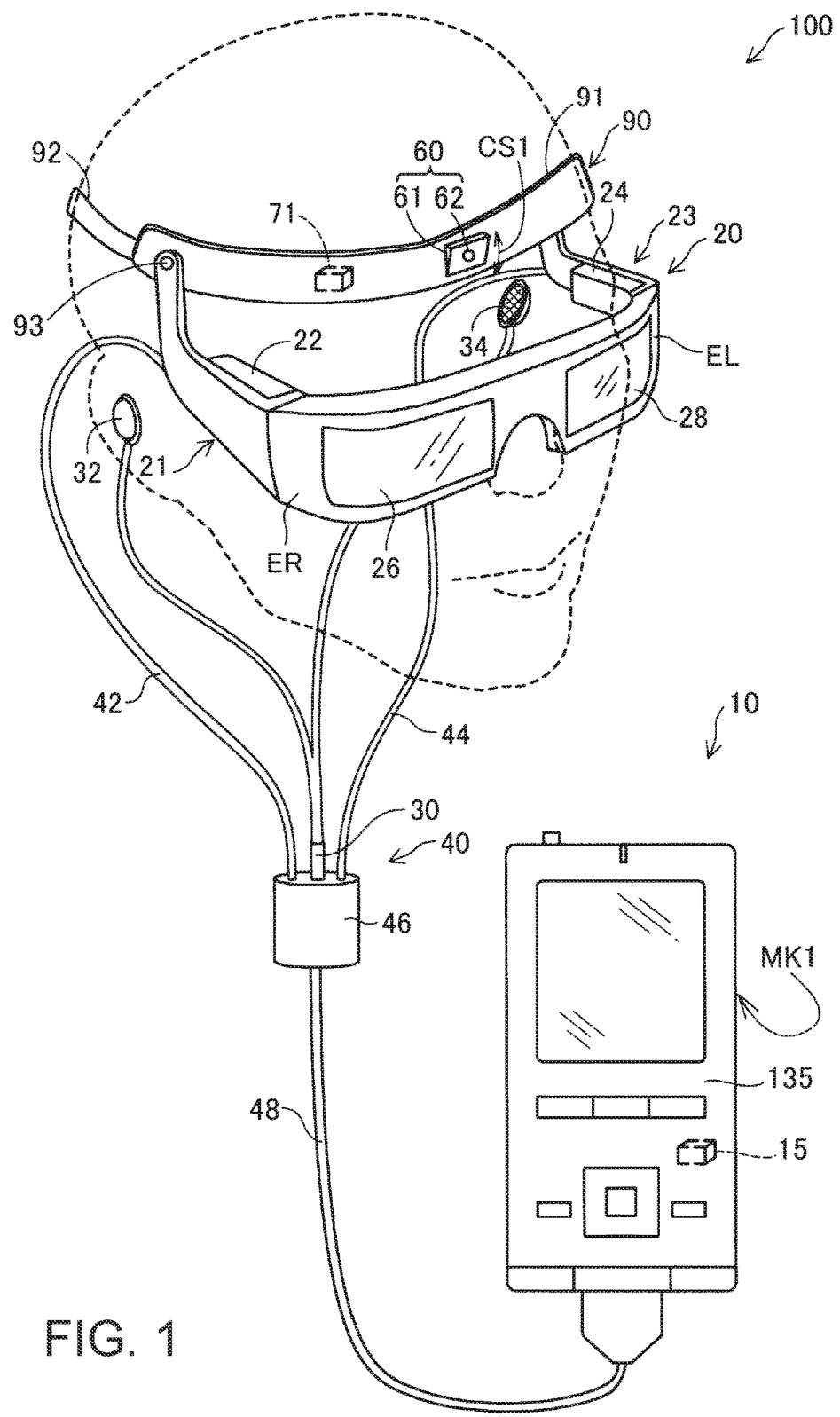
FIG. 1 is a diagram illustrating a schematic configuration of an HMD.

FIG. 1 is a diagram illustrating a schematic configuration of an HMD 100. The HMD 100 is a head-mounted display. The HMD 100 is an optical transmission type head-mounted display which enables a user to view a virtual image and to simultaneously view an outside scenery directly. The HMD 100 includes a camera 60 (to be described below) as an imaging section, and thus serves as an imaging device.

The HMD 100 includes a fitting band 90 that is fitted on the head of a user, a display section 20 that displays an images, and a control section (controller) 10 that controls the display section 20. The display section 20 enables the user to view a virtual image in a state in which the display section 20 is fitted on the head of the user.

The fitting band 90 includes a fitting base portion 91 formed of a resin, a fabric belt portion 92 connected to the fitting base portion 91, a camera 60, and an IMU 71. The fitting base portion 91 has a curved shape matched to the frontal head part of a person. The belt portion 92 is a belt that is fitted around the head of the user.

The camera 60 can image an outside scenery and is disposed in a middle portion of the fitting base portion 91. In other words, the camera 60 is disposed at a position corresponding to the middle of the forehead of the user in a state in which the fitting band 90 is fitted on the head of the user. Therefore, in the state in which the user fits the fitting band 90 on the head of the user, the camera 60 images an outside scenery which is an external scenery in a visual line direction of the user and acquires a captured image which is an images obtained through imaging.

The camera 60 includes a camera base portion 61 that is rotated with respect to the fitting base portion 91 and a lens portion 62 of which a relative position to the camera base portion 61 is fixed. When the fitting band 90 is fitted on the head of the user, the camera base portion 61 is disposed to be rotatable along an arrow CS1 which is a predetermined range of an axis included in a plane including a central axis of the user. Therefore, the direction of an optical axis of the lens portion 62 which is an optical axis of the camera 60 can be changed within the range of the arrow CS1. The lens portion 62 images a range which is changed by zoom about the optical axis.

The IMU 71 (Inertial Measurement Unit) is an inertial sensor that detects acceleration. The IMU 71 can detect an angular velocity and geomagnetism in addition to acceleration. The IMU 71 is contained in the fitting base portion 91. Therefore, the IMU 71 detects acceleration, angular velocities, and geomagnetism of the fitting band 90 and the camera base portion 61.

Since a relative position of the IMU 71 to the fitting base portion 91 is fixed, the camera 60 is movable with respect to the IMU 71. Further, since a relative position of the display section 20 to the fitting base portion 91 is fixed, a relative position of the camera 60 to the display section 20 is movable.

The display section 20 is a display section connected to the fitting base portion 91 of the fitting band 90 and has a glasses shape in the embodiment. The display section 20 includes a right holding section 21, a right display driving section 22, a left holding section 23, a left display driving section 24, a right optical image display section 26, and a left optical image display section 28. The right optical image display section 26 and the left optical image display section 28 are located in front of the right and left eyes of the user when the display section 20 is fitted on the user. One end of right optical image display section 26 and one end of the left optical image display section 28 are connected to each other at a position corresponding to the middle of the forehead of the user when the display section 20 is fitted on the user.

The right holding section 21 has a shape which extends from an end portion ER which is the other end of the right optical image display section 26 in a substantially horizontal direction and is inclined upward obliquely from the middle of the shape and connects the end portion ER to a right connection portion 93 of the fitting base portion 91. Similarly, the left holding section 23 has a shape which extends from an end portion EL which is the other end of the left optical image display section 28 in a substantially horizontal direction and is inclined upward obliquely from the middle of the shape and connects the end portion EL to a left connection portion (not illustrated) of the fitting base portion 91. The right holding section 21 and the left holding section 23 are connected to the fitting base portion 91 by the right and left connection portions 93, and thus the right optical image display section 26 and the left optical image display section 28 are located in front of the eyes of the user. The connection portions 93 connect the right holding section 21 and the left holding section 23 to be rotatable and fixable at any rotation positions. The detailed mechanisms of the connection portions 93 are known, and thus the detailed description thereof will be omitted. As a result, the display section 20 is installed to be rotatable with respect to the fitting base portion 91.

The right holding section 21 is a member installed to extend from the end portion ER which is the other end of the right optical image display section 26 to a position corresponding to a temporal region of the user when the display section 20 is fitted on the user. Similarly, the left holding section 23 is a member installed to extend from the end portion EL which is the other end of the left optical image display section 28 to a position corresponding to a temporal region of the user when the display section 20 is fitted on the user. The right display driving section 22 and the left display driving section 24 are disposed on sides facing the head of the user when the display section 20 is fitted on the user.

The display driving sections 22 and 24 include liquid crystal displays 241 and 242 (hereinafter also referred to as "LCDs 241 and 242") and projection optical systems 251 and 252 to be described below in FIG. 2. The details of the configurations of the display driving sections 22 and 24 will be described below.

The optical image display sections 26 and 28 include light-guiding plates 261 and 262 (see FIG. 2) and light adjustment plates to be described below. The light-guiding plates 261 and 262 are formed of a light transmission resin material or the like and guide image light output from the display driving sections 22 and 24 to the eyes of the user. The light adjustment plates are optical elements with a thin plate shape and are disposed to cover the front side of the display section 20 which is an opposite side to the side of the eyes of the user. By adjusting light transmittance of the light adjustment plates, it is possible to adjust the amount of external light entering the eyes of the user and adjust easiness of view of a virtual image.

The display section 20 further includes a connection section 40 connecting the display section 20 to the control section 10. The connection section 40 includes a body cord 48 connected to the control section 10, a right cord 42, a left cord 44, and a connection member 46. The right cord 42 and the left cord 44 are two branched cords of the body cord 48. The display section 20 and the control section 10 transmit various signals via the connection section 40. In the right cord 42, the left cord 44, and the body cord 48, for example, a metal cable or an optical fiber can be adopted.

The control section 10 is a device that controls the HMD 100. The control section 10 includes an operation section 135 that includes an electrostatic track pad or a plurality of buttons which can be pressed and a real maker MK that is used for calibration in imaging. The operation section 135 is disposed on the front surface of the control section 10. The MK is disposed on the back surface of the control section 10. Therefore, the real marker MK is not illustrated in FIG. 1. The details of the real marker MK will be described below.

Figure 2:
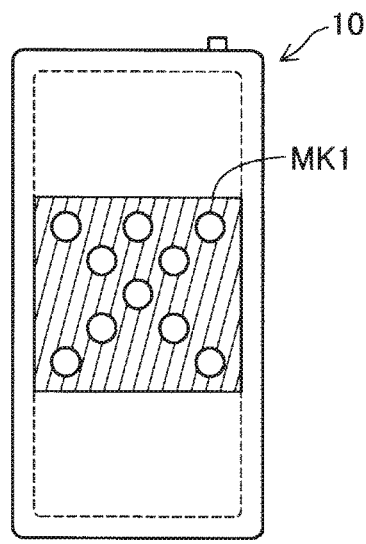
FIG. 2 is a schematic diagram illustrating a real marker.
Figure 3:
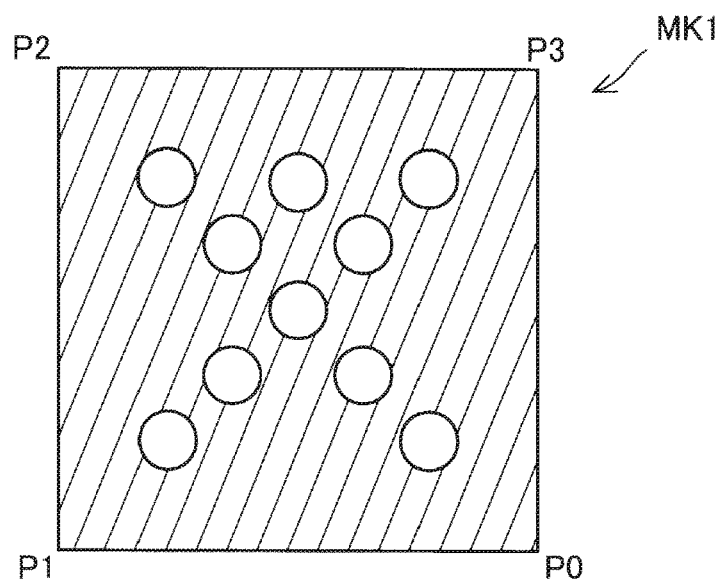
FIG. 3 is a detailed diagram illustrating the real marker.

FIG. 2 is a schematic diagram illustrating the real marker MK. FIG. 3 is a detailed diagram illustrating the real marker MK. As illustrated in FIG. 2, the real marker MK is disposed on the rear surface of the control section 10. As illustrated in FIG. 3, the real marker MK is a 2-dimensional marker in which 10 circles are formed in a square which connects four vertexes P0, P1, P2, and P3 with straight lines. In a conversion parameter calculation process to be described below, the degree of superimposition between the real marker MK imaged by the camera 60 and a marker image IMG (to be described below) is determined by using coordinate values of centers of white circles.

Figure 4:
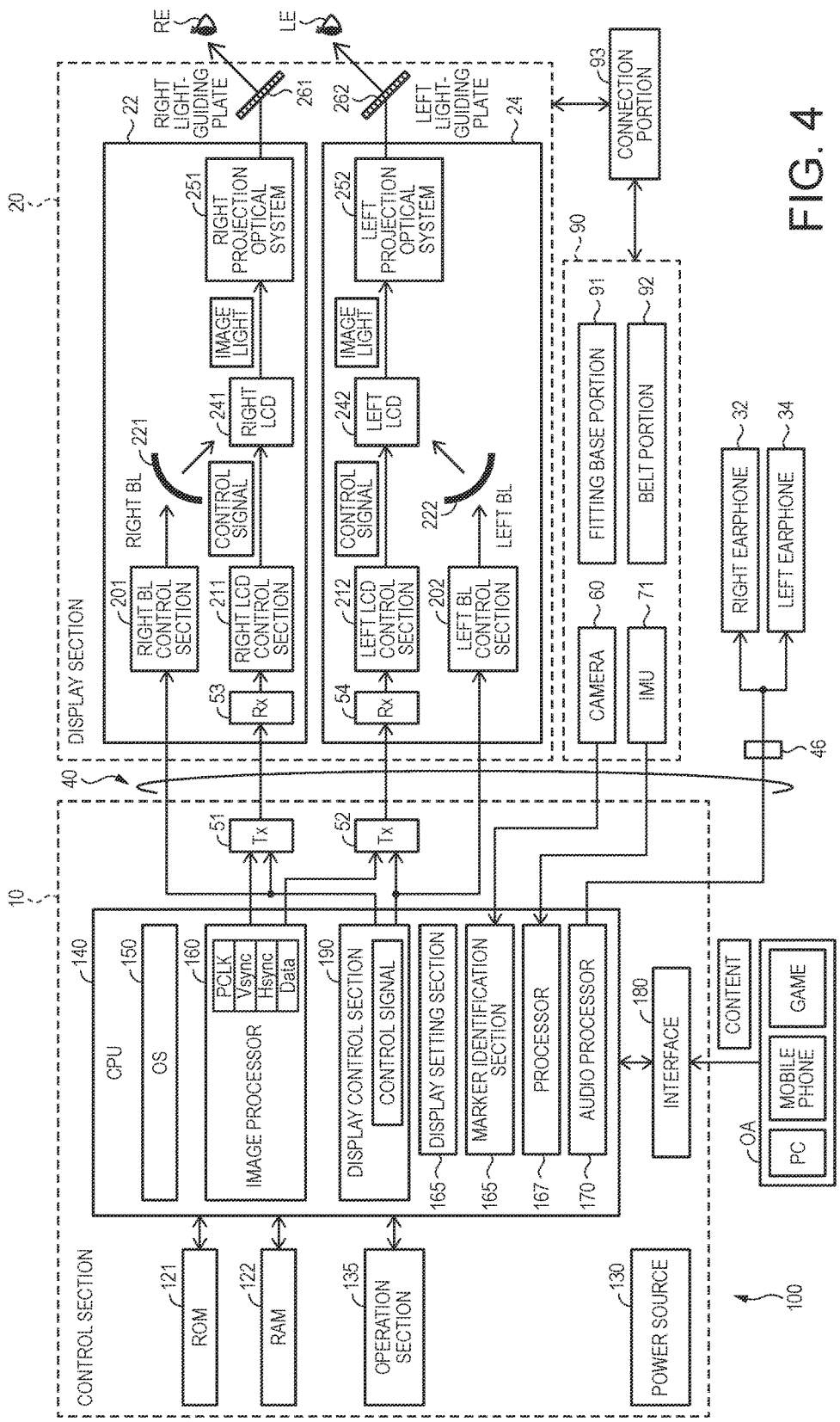
FIG. 4 is a block diagram illustrating a functional configuration of the HMD.

FIG. 4 is a block diagram illustrating a functional configuration of the HMD 100. As illustrated in FIG. 4, the control section 10 includes a ROM 121, a RAM 122, a power source 130, the operation section 135, an identification target storage section 139, a CPU 140, an interface 180, a transmission section 51 (Tx 51), and a transmission section 52 (Tx 52).

The power source 130 feeds power to each section of the HMD 100. The ROM 121 stores various programs. The CPU 140 executes various programs by loading the various programs stored in the ROM 121 on the RAM 122. In another embodiment, one or more processors may be included in the control section 10 and/or the display section 20 of HMD 100, instead of a single CPU 140.

The CPU 140 loads programs stored in the ROM 121 on the RAM 122 to function as an operating system 150 (OS 150), a display control section 190, an audio processor 170, an image processor 160, a marker identification section 165, and a processor 167.

The display control section 190 generates control signals to control the right display driving section 22 and the left display driving section 24. The display control section 190 controls generation and emission of image light in accordance with each of the right display driving section 22 and the left display driving section 24. The display control section 190 transmits control signals for the right LCD control section 211 and the left LCD control section 212 via the transmission sections 51 and 52, respectively. The display control section 190 transmits control signals for a right backlight control section 201 and a left backlight control section 202.

The image processor 160 acquires an image signal included in content and transmit the acquired image signal to reception sections 53 and 54 of the display section 20 via the transmission sections 51 and 52. The audio processor 170 acquires an audio signal included in the content, amplifies the acquired audio signal, and supplies the amplified audio signal to a speaker (not illustrated) inside the right earphone 32 and a speaker (not illustrated) inside the left earphone 34 connected to the connection member 46.

The marker identification section 165 binarizes captured images obtained by the camera 60 using a predetermine gray scale value as a threshold. The marker identification section 165 extracts the same real marker MK as the marker image IMG stored in the ROM 121 from the binarized images. In the embodiment, the marker identification section 165 first binarizes captured images using a preset initial threshold. The marker identification section 165 extracts an image for which the same feature points as those of the marker image IMG are determined in the binarized images from the captured images.

The feature points of the marker image IMG are vertexes P0, P1, P2, and P3, which are 4 vertexes of a square, and 9 white circles included in the square. The marker identification section 165 extracts the real marker MK to be determined to be the same as the marker image IMG in the captured image by determining whether circles are arranged as the feature points of the 9 circles with the same positional relationship as that of the marker image IMG on diagonal lines connecting two facing vertexes. For example, the marker identification section 165 determines whether 5 binarized white circles are arranged with respect to black on a straight line connecting vertexes P0 and P2 and/or a straight line connecting vertexes P1 and P3 using the sizes of the arranged white colors or the sizes of black regions interposed between the plurality of circles in FIG. 3.

In a case in which the marker identification section 165 may not extract the real marker MK through the binarization using the initial threshold, the marker identification section 165 extracts the real marker MK by binarizing the captured image using an added threshold which is a preset gray scale value as a new threshold added to the initial threshold. In this way, the marker identification section 165 extracts the real marker MK from the captured image by binarizing the captured image using several gray scale values as thresholds. In a case in which the marker identification section 165 may not extract the real marker MK from an imaging range even using the plurality of thresholds, the marker identification section 165 determines that the real marker MK is not included in the imaging range.

In a case in which the real marker MK is extracted by the marker identification section 165, for example, the processor 167 calculates a marker pose using, for example, a homography matrix. A spatial relationship (rotational relationship) between the camera 60 and the real marker MK is calculated with the marker pose. As will be described below, the processor 167 calculates a rotational matrix for converting a coordinate system fixed to the camera into a coordinate system fixed to the IMU 71 using the calculated spatial relationship and a detected value such as acceleration detected by the IMU 71.

The interface 180 is an input and output interface that connects various external devices OA which are content supply sources to the control section 10. Examples of the external devices OA include a storage device storing an AR scenario, a personal computer (PC), a mobile phone terminal, and a game terminal. Examples of the interface 180 include a USB interface, a micro USB interface, and a memory card interface.

As illustrated in FIG. 4, the display section 20 includes the right display driving section 22, the left display driving section 24, the right light-guiding plate 261 serving as the right optical image display section 26, and the left light-guiding plate 262 serving as the left optical image display section 28.

The right display driving section 22 includes the reception section 53 (Rx 53), a right backlight control section 201, a right backlight 221, a right LCD control section 211, the right LCD 241, and the right projection optical system 251. The right backlight control section 201 and the right backlight 221 function as a light source. The right LCD control section 211 and the right LCD 241 function as a display element. In another embodiment, instead of the foregoing configuration, the right display driving section 22 may include a spontaneous emission type display element such as an organic EL display element or may include a scan type display element that scans an optical beam from a laser diode on a retina. The same also applies to the left display driving section 24.

The reception section 53 functions as a receiver that performs serial transmission between the control section 10 and the display section 20. The right backlight control section 201 drives the right backlight 221 based on an input control signal. The right backlight 221 is, for example, an emitter such as an LED or an electroluminescence (EL). The right LCD control section 211 drives the right LCD 241 based on control signals transmitted from the image processor 160 and the display control section 190. The right LCD 241 is a transmission type liquid crystal panel in which a plurality of pixels are arrayed in a matrix form.

The right projection optical system 251 is configured to include a collimating lens that forms image light emitted from the right LCD 241 as a light flux in a parallel state. The right light-guiding plate 261 serving as the right optical image display section 26 guides the image light output from the right projection optical system 251 to the right eye RE of the user while reflecting the image light along a predetermined light path. The left display driving section 24 has the same configuration as the right display driving section 22 and corresponds to the left eye LE of the user, and thus the description thereof will be omitted.

The precision of calibration performed using the IMU 71 and the camera 60 is different according to the performance of the IMU 71 which is an inertial sensor. When a cheap IMU of which precision is not high is used, a large error or drift may occur in calibration in some cases.

In the embodiment, calibration is performed by a batch solution base algorithm using a multi-position method using the IMU 71. In the embodiment, design data at the time of manufacturing is used for a translational relationship between the IMU 71 and the camera 60. The multi-position method has the following advantages (A) to (D) when the calibration is performed.

(A) Since the detection of the IMU 71 and the imaging of the camera 60 are performed at a static position, there is no problem in time synchronization.

(B) by using the detected value or the captured image at the plurality of positions, it is possible to reduce noise of the IMU 71 (each sensor included in the IMU 71) and the camera 60 through filtering.

(C) Since outputs of the gyro sensor, the acceleration sensor, and the geomagnetic sensor in the IMU 71 are fused and the pose of the IMU 71 (hereinafter referred to as an IMU orientation) is obtained, the drift of each sensor is corrected and the IMU orientation is high precise.

(D) The real marker MK disposed on the control section 10 is used, and thus a device performing complicated calibration or another device other than the HMD 100 is not necessary.

Before a calibration process to be described below with FIG. 7, another calibration (hereinafter referred to as independent calibration) is performed on the IMU 71 and the camera 60. A known technology generally widely known may be used as a specific independent calibration method, and the description thereof will be omitted in the present specification.

In the independent calibration, the IMU 71 is calibrated. Specifically, for a triaxial acceleration sensor (Ax, Ay, Az), a triaxial gyro sensor (Gx, Gy, Gz), and a triaxial geomagnetic sensor (Mx, My, Mz) included in the IMU 71, gain/scale, static bias/offset, and skew between three axes are calibrated.

when such calibration is performed, the IMU 71 outputs acceleration, an angular velocity, and geomagnetism as output values of the acceleration, the angular velocity, and the geomagnetism. Such output values are values obtained by correcting a gain, static bias/offset, and misalignment between three axes. The calibration is performed at a manufacturing factory or the like when the HMD 100 is manufactured in the embodiment.

In the calibration of the camera 60 performed through the independent calibration, intrinsic parameters of the camera 60 including a focal distance, skew, a main point position, and distortion in the camera 60 are calibrated. A known technology can be applied to the calibration of the camera 60.

After the calibration of each sensors included in the IMU 71 is performed, detected values (measured outputs) of the acceleration, the angular velocity, and the geomagnetism of the sensors in the IMU 71 are fused, and thus high precise IMU orientation can be obtained.

Figure 5:
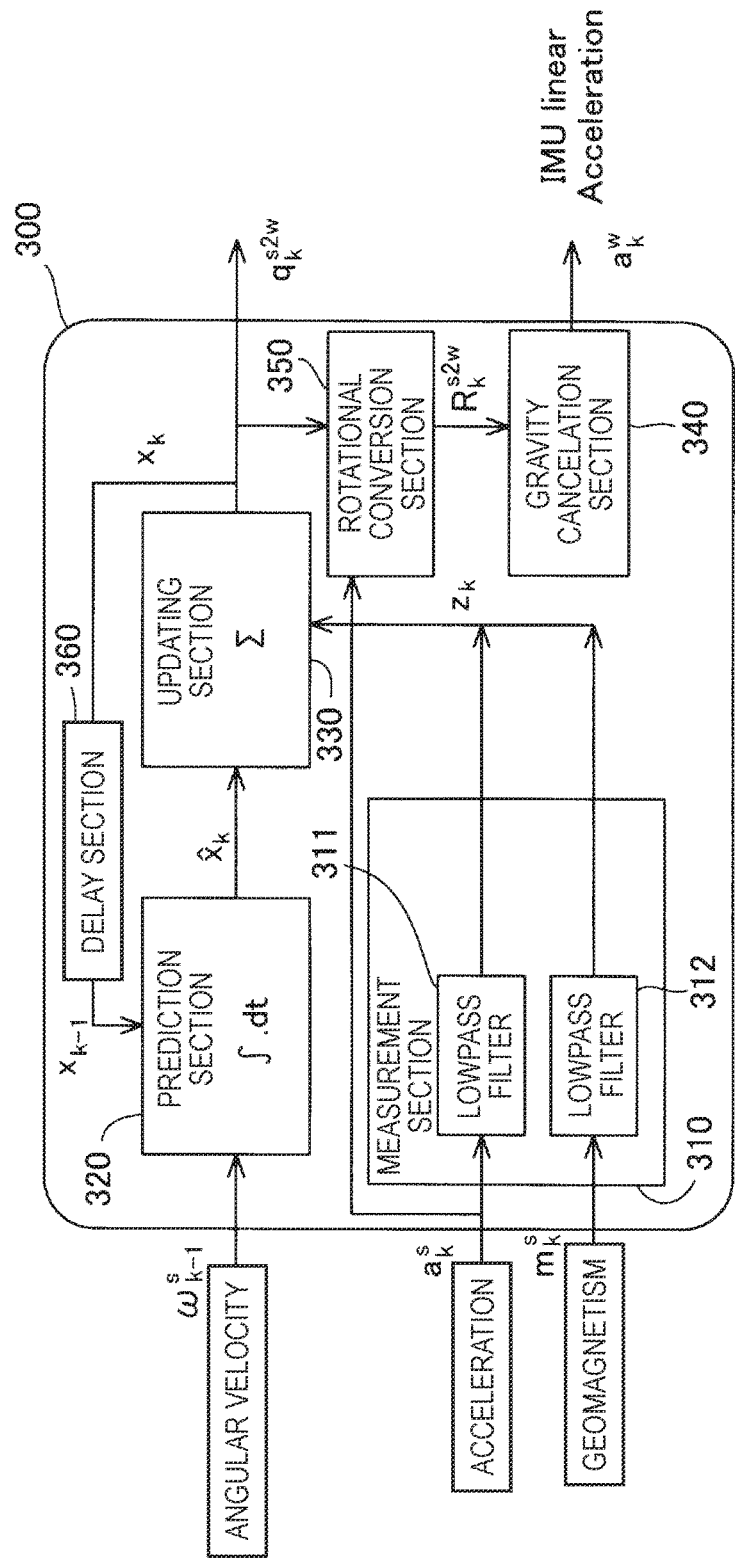
FIG. 5 is a block diagram illustrating a fusion section in an IMU.

FIG. 5 illustrates the fusion section 300 in the IMU 71. The fusion section 300 may be present outside the IMU 71. The fusion section 300 fuses measures (values or signals) of the inertial sensors based on an extended Kalman filter (EKF). In the embodiment, the IMU orientation is expressed by quaternions. The notation by quaternion can be converted into a rotational matrix. The extended Kalman filter is applied to a state vector expressed as follows.

$$X=[q_{s2w}, b_{gyro}] \tag{a}$$

A control input vector is decided by an input of the gyro sensor.

$$u=[w^s] \tag{b}$$

A state transition model from K−1 to K at an interval Δt is expressed in the following equation.

$$x_k=f(x_{k-1}, u_{k-1}, w_{k-1}) \tag{c}$$

Here, $w_{k-1}$ is a noise vector.

As illustrated in FIG. 5, the fusion section 300 includes a measurement section 310, a prediction section 320, an updating section 330, a gravity cancellation section 340, a rotational conversion section 350, and a delay section 360.

The measurement section 310 functions based on measurements $a^s_k$ and $m^s_k$ of acceleration output from the acceleration sensor and geomagnetism output from the geomagnetic sensor. The measurement section 310 includes lowpass filters 311 and 312. The lowpass filter 311 reduces noise of the measured acceleration $a^s_k$. The lowpass filter 312 reduces noise of the measured geomagnetism $m^s_k$.

The prediction section 320 estimates an amount (or a pose) of angle change by integrating angular velocities $\omega^s_{k-1}$ detected for a predetermined time and outputs the predicted angle change (or pose) to the updating section 330. The updating section 330 filters, that is, fuses measures $z_k$ (acceleration and geomagnetism) using the predicted angle change (or pose). Then, the fused IMU orientation $q^{s2w}_k$ is updated and output. The fused IMU orientation $q^{s2w}_k$ is fed back to the prediction section 320 via the delay section 360 for the purpose of a subsequent cycle. When the fused IMU orientation $q^{s2w}_k$ is calculated, a dynamic or linear acceleration $a^w_k$ of the IMU 71 is calculated through cancellation of gravity by the gravity cancellation section 340.

The rotational conversion section 350 receives the IMU orientation $q^{s2w}_k$, converts the IMU orientation $q^{s2w}_k$ into a rotational matrix $R^{s2w}_k$, and outputs the rotational matrix $R^{s2w}_k$. The acceleration $a^s_k$ measured from the acceleration sensor is input to the gravity cancellation section 340. The gravity cancellation section 340 cancels the gravitational acceleration of the earth using the IMU orientation expressed by the rotational matrix $R^{s2w}_k$, and then calculates and outputs a linear acceleration $a^w_k$ of the IMU 71 not included in the component of the gravitational acceleration.

Adjustment for the fusion of the detected values based on the above-described extended Kalman filter can be performed at a factory at which the HMD 100 is manufactured. The calibration of the camera 60 and the IMU 71 can also be performed at a factory at which the HMD 100 is manufactured.

On the other hand, the CPU 140 performs a calibration process (to be described below with FIG. 7). The calibration process is a process of performing offline calibration of the HMD 100. In the offline calibration, a rotational matrix $R_{cam2imu}$ from the coordinate system fixed to the camera 60 to the coordinate system fixed to the IMU 71 is derived. The rotational matrix $R_{cam2imu}$ indicates a spatial relationship between the camera 60 and the IMU 71. The subscript cam2imu means camera to imu. The derivation of the rotational matrix $R_{cam2imu}$ is one purpose of the embodiment. Next, the rotational matrix $R_{cam2imu}$ will be described.

Figure 6:
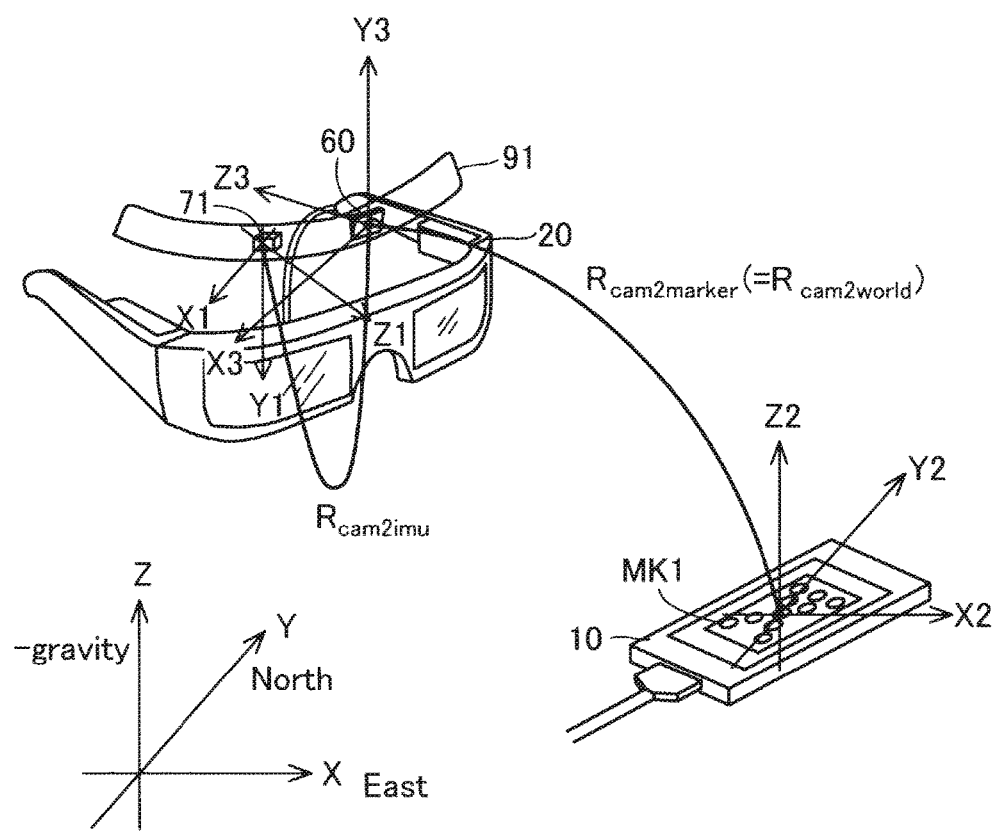
FIG. 6 is a schematic diagram illustrating a positional relationship between a camera and the real marker.

FIG. 6 is a schematic diagram illustrating a positional relationship between the camera 60 and the real marker MK in a case in which the real marker MK is imaged. FIG. 6 illustrates the display section 20, the fitting base portion 91 which is a part of the fitting band 90, the camera 60, the IMU 71 contained and fixed in the fitting base portion 91, and the control section 10.

FIG. 6 illustrates the rotational matrix $R_{cam2imu}$ from a camera coordinate system (X3-Y3-Z3) to the IMU coordinate system (X1-Y1-Z1) and a rotational matrix $R_{cam2marker}$ from the camera coordinate system to a marker coordinate system (X2-Y2-Z2). Here, in a case in which it is satisfied the condition that the control section 10 is not moved in the earth, $R_{cam2marker}$ is fixed to $R_{cam2world}$. $R_{cam2world}$ is a rotational matrix from the camera coordinate system to a world coordinate system (absolute coordinate system: X-Y-Z). The world coordinate system is a coordinate system fixed to the earth.

In a case in which the camera 60 and the IMU 71 are rotated from a certain static position A to another static position B, a change in a rotational angle satisfies the following equation. The static positions are positions defined on the world coordinate system. $R_{cam2imu}$ of the following equation is a rotational matrix from the camera 60 to the IMU 71, as described above.

$$R_{camA2B} = R_{cam2imu}^{-1} R_{imuA2B} R_{cam2imu} \qquad (d)$$

$R_{camA2B}$ is a rotational angle (expressed by a matrix) of the camera 60 changed in a case in which the camera 60 is rotated from the position A to the position B. That is, $R_{camA2B}$ is a rotational matrix from a first pose which is a pose of the camera 60 at the position A to a second pose which is a pose of the camera 60 at the position B.

$R_{imuA2B}$ is a rotational angle (expressed by a matrix) of the IMU 71 changed in a case in which the IMU 71 is rotated from the position A to the position B. That is, $R_{imuA2B}$ is a rotational matrix from a pose of the IMU 71 at the position A to a pose of the IMU 71 at the position B. Further, in other words, $R_{imuA2B}$ indicates a difference between a first pose which is a pose of the IMU 71 at the position A and a second pose which is a pose of the IMU 71 at the position B.

A process of deriving Equation (d) will be described below. A change in the rotational angle of the camera in a case in which the camera 60 and the IMU 71 are displaced from the position A to the position B is calculated by the following equation.

$$R_{camA2B} = R_{cam2world}^{-1}(B) R_{cam2world}(A) \qquad (e)$$

$R_{cam2world}(A)$ can be obtained from a first captured image which is a captured image at the position A. $R_{cam2world}(B)$ can be obtained from a second captured image which is a captured image at the position B. In such calculation, the homography matrix is used, as described above. When the homography matrix is used, a pose of a planar marker with respect to the camera 60 can be derived. The real marker MK is a planar marker.

Similarly, an IMU rotational angle is calculated by the following equation.

$$R_{imuA2B} = R_{imu2world}^{-1}(B) R_{imu2world}(A) \qquad (f)$$

$R_{imu2world}$ is the IMU orientation $q^{s2w}_k$ and can also be ascertained as a rotational matrix from the IMU coordinate system to the world coordinate system. $R_{imu2world}(A)$ can be calculated from the IMU orientation $q^{s2w}_k$ at the position A. $R_{imu2world}(B)$ can be calculated from the IMU orientation $q^{s2w}_k$ at the position B.

Incidentally, the following two equations are established.

$$R_{cam2world}(A) = R_{imu2world}(A) R_{cam2imu} \qquad (g)$$

$$R_{cam2world}(B) = R_{imu2world}(B) R_{cam2imu} \qquad (h)$$

When Equation (h) is derived to Equation (e), the following equation is obtained.

$$R_{camA2B} = (R_{imu2world}(B) R_{cam2imu})^{-1} R_{cam2world}(A) \qquad (i)$$

When Equation (g) is derived to Equation (i), the following equation is obtained.

$$R_{camA2B} = (R_{imu2world}(B) R_{cam2imu})^{-1} R_{imu2world}(A)$$
$$R_{cam2imu} = R_{cam2imu}^{-1} R_{imu2world}^{-1}(B) R_{imu2world}(A) R_{cam2imu} \qquad (j)$$

When Equation (f) is derived to Equation (j), Equation (d) is obtained.

$R_{cam2imu}$ can be obtained using Equation (d). A specific calibration method in the embodiment is based on nonlinear optimization that iteratively refines $R_{cam2imu}$ to be higher precise. For the purpose of the high precision, an initial estimated value of $R_{cam2imu}$ is first necessary. The initial estimated value may be a rough estimated value from design or use. For example, the following equation can be used to obtain the initial estimated value of $R_{cam2imu}$.

$$R_{cam2imu} = \begin{bmatrix} 1 & 0 & 0 \\ 0 & -1 & 0 \\ 0 & 0 & -1 \end{bmatrix} \quad (1)$$

$R_{cam2world}$ is obtained from a marker tracking algorithm. Then, $R_{camA2B}$ is expressed in Equation (e). Thus, $R_{camA2B}$ expressed using $R_{cam2world}$ obtained from the marker tracking algorithm is notated as $R_{camA2B}^{Obs}$. That is, $R_{camA2B}^{Obs}$ is based on measurement and is expressed by the following equation.

$$R_{camA2B}^{Obs} = R_{cam2world}^{-1}(B) R_{cam2world}(A) \quad (k)$$

On the other hand, $R_{camA2B}$ calculated from Equation (d) is notated as $R_{camA2B}^{Pred}$. That is, $R_{camA2B}^{Pred}$ is predicted value and expressed by the following equation.

$$R_{camA2B}^{Pred} = R_{cam2imu}^{-1} R_{imuA2B} R_{cam2imu} \quad (l)$$

When an error between $R_{camA2B}^{Obs}$ and $R_{camA2B}^{Pred}$ is small, precision of Equation (d) which is the origin of $R_{camA2B}^{Pred}$ is high. The fact that the precision of Equation (d) is high means that precision of $R_{cam2imu}$ is high. Accordingly, the following equation for obtaining an angle between measured rotation and predicted rotation is defined as an error measurement equation.

$$e = a\cos((\text{trace}(R_{camA2B}^{Obs*}(R_{camA2B}^{Pred})')^{-1})*0.5) \quad (m)$$

When the rotational matrix $R_{cam2imu}$ in which the value of e decreases can be obtained, the rotational matrix $R_{cam2imu}$ appropriately describes a spatial relationship between the camera 60 and the IMU 71.

In order to acquire $R_{camA2B}^{Obs}$ and $R_{camA2B}^{Pred}$ included in Equation (m), it is necessary to acquire a measurement data group. One measurement data group is configured to include captured images acquired substantially the same time and data (geomagnetism $m^s_k$, acceleration $a^s_k$, and angular velocity $\omega^s_k$) which is the origin of the IMU orientation $q^{s2w}_k$. Hereinafter, a derivation order of the rotational matrix $R_{cam2imu}$ expressing the spatial relationship between the camera 60 and the IMU 71, including acquisition of the measurement data group, will be specifically described.

Figure 7:
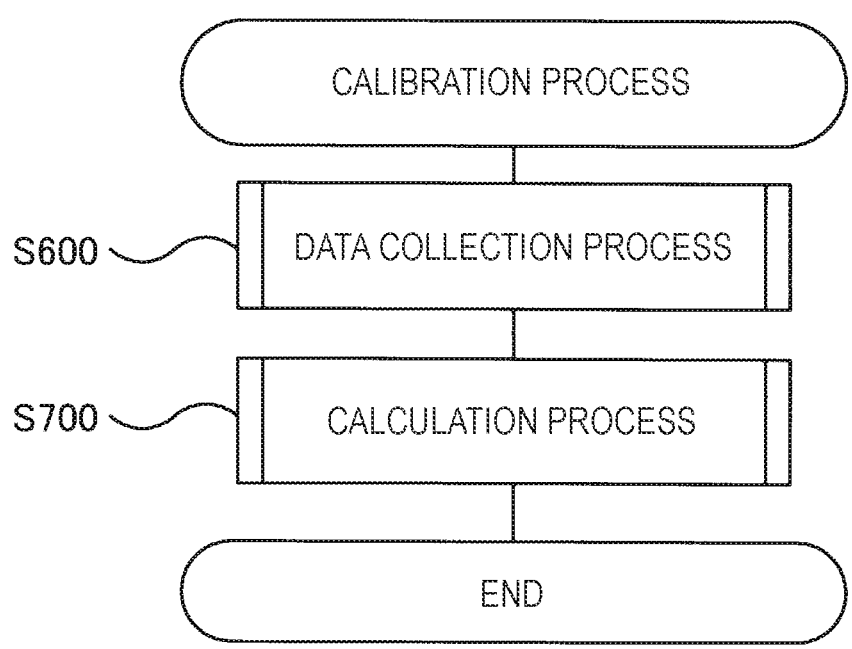
FIG. 7 is a flowchart illustrating a calibration process.

FIG. 7 is a flowchart illustrating a calibration process. The calibration process is performed to obtain the rotational matrix $R_{cam2imu}$. The processor 167, that is, the CPU 140, executes a program stored in the ROM 121 using an instruction from a user as a trigger to realize the calibration process. The calibration process is configured to include a data collection process (S600) and a calculation process (S700).

An overview of the data collection process will be described. In order to ensure precision of the calibration, data is preferably collected at different view angles and covers all of the ranges of an effective operation range. All of the operation range is divided into 10 (or greater than 10) views. The operation range is a hemisphere. The views into which collected data is entered during the period of the calibration are highlighted. Since a user can easily understand which view is covered and which view is not covered, the user can ascertain where the data is collected. In a case in which the minimum data is collected, the user is notified that the minimum data is collected. In the embodiment, the views are expressed by the pose of the real marker MK with respect to the camera 60 (the pose of the real marker MK expressed on the coordinate system of the camera 60).

Figure 8:
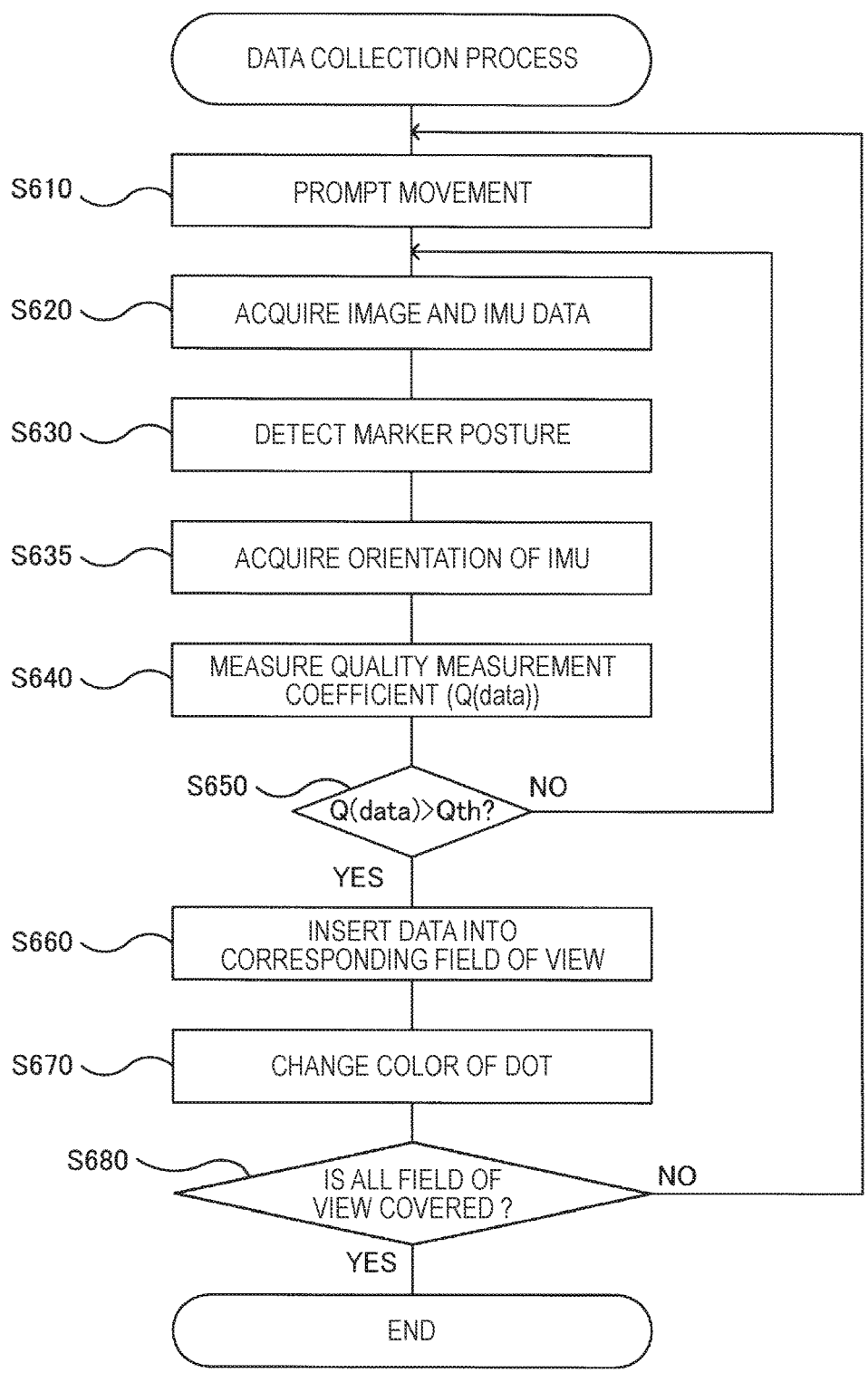
FIG. 8 is a flowchart illustrating a data collection process.

FIG. 8 is a flowchart illustrating the data collection process. First, the user is prompted to continue movement gradually toward a view from which a measurement data group is to be acquired (S610). As a result, the user continues the movement gradually toward an unmarked view. This prompt will be described with reference to FIG. 9.

Figure 9:
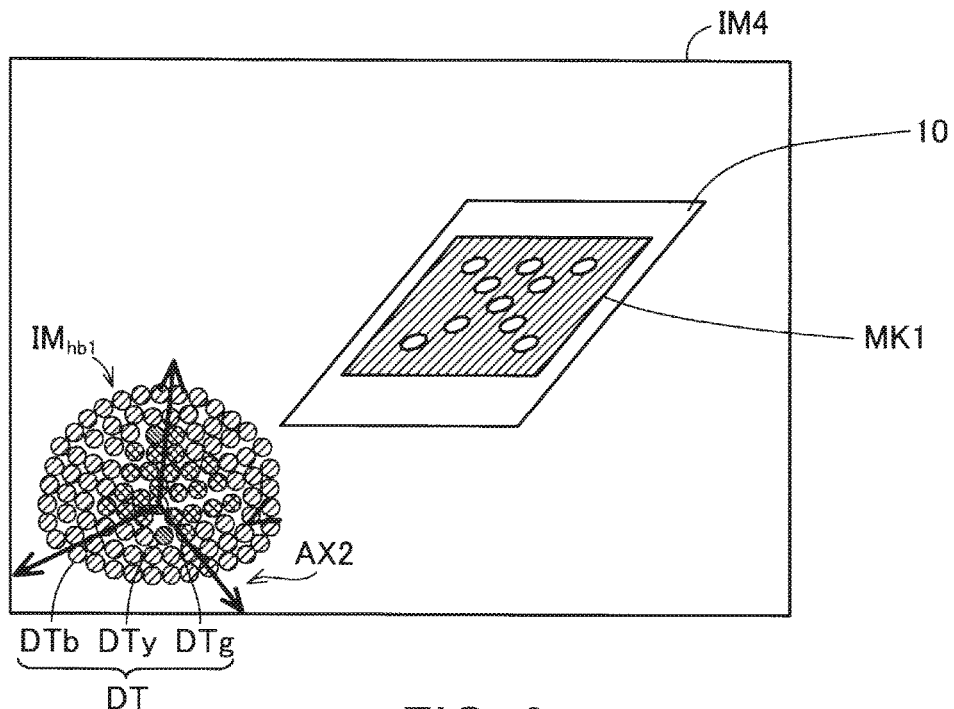
FIG. 9 is a diagram illustrating a display image.

FIG. 9 is a diagram illustrating a display image IM4. A display image IM4 is an image for realizing S610. In order to acquire the measurement data group, it is necessary to image the real marker MK with the camera 60. The user is instructed in advance not to move the real marker MK during the acquisition of the measurement data group.

Figure 10:
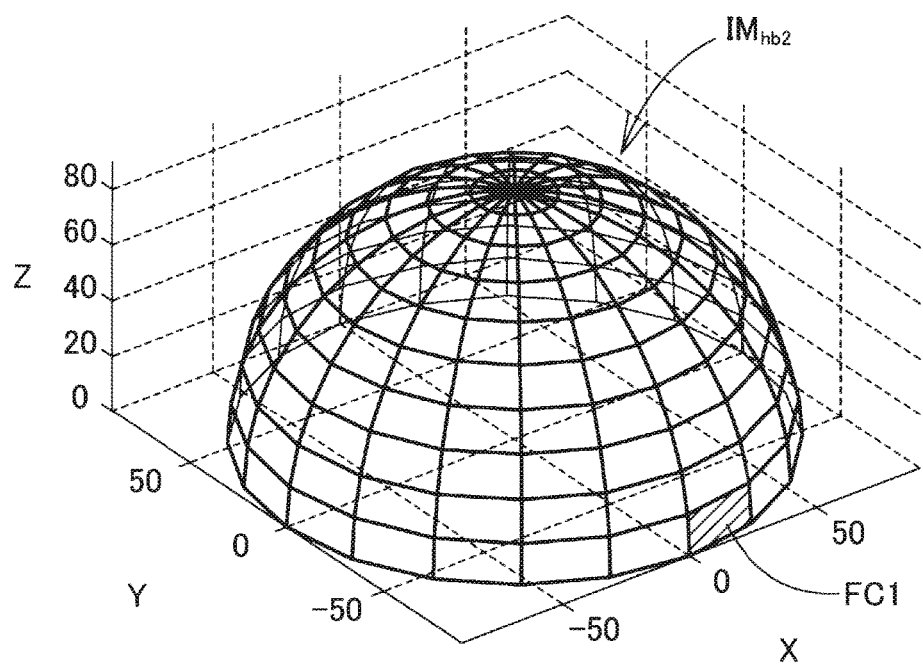
FIG. 10 is a diagram illustrating a hemisphere.

The display image IM4 includes a plurality of dots DT. The plurality of dots DT form a hemisphere $IM_{hb1}$. FIG. 10 is a diagram illustrating a hemisphere $IM_{hb2}$. The plurality of dots DT are disposed on the hemisphere $IM_{hb2}$.

Each of the plurality of dots DT is colored with one of three colors. A blue dot DTb of blue represents a view in which the measurement data group has not been obtained. A green dot DTg of green represents a view in which the measurement data group has already been obtained. A yellow dot DTy of yellow represents a view in which more measurement data groups preferably need to be acquired.

When even one of the blue dot DTb and the yellow dot DTy is displayed, the user is instructed in advance to perform movement toward to the view indicated by such a dot DT. That is, the display of the blue dot DTb or the yellow dot DTy prompts the user to continue the movement gradually toward a view in which the measurement data group preferably needs to be acquired.

When all of the dots DT are the green dots DTg, the user is informed of completion of the acquisition of the measurement data group over a predetermined spatial relationship.

While S610 is performed, the measurement data group is acquired in regard to the view in which the acquisition of the measurement data group is not completed (S620). That is, the process of S620 includes imaging the real marker MK and detecting the data (geomagnetism $m^s_k$, acceleration $a^s_k$, and angular velocity $\omega^s_k$) which is the origin or base of the IMU orientation $q^{s2w}_k$. Then, marker poses are detected from the captured images included in the acquired measurement data group (S630). Subsequently, the IMU orientation $q^{s2w}_k$ is acquired from the acquired measurement data group (S635).

Next, a quality measurement function Q (data) is calculated (S640). The quality of the measurement data group is evaluated by the quality measurement function Q (data). Q (data) is decided from both of the IMU orientation $q^{s2w}_k$ and the marker pose. That is, Q (data) is a function of the IMU orientation $q^{s2w}_k$ and the marker pose, in other words, a function of the measurement data group. Specifically, the quality measurement function Q (data) outputs a value to determine whether one certain measurement data group is reliable. One certain measurement data contains a data pair. Hereinafter, one certain measurement data and another measurement data group are also collectively referred to as data pairs.

In a case in which noise is much in the IMU orientation $q^{s2w}_k$ (for example, a case in which a spike or a random value is detected), the quality of data is poor. When a motion of a user is faster, the quality of the IMU orientation $q^{s2w}_k$ is worse. In a case in which there is jitter (or jittering) in several views or there is motion blur in the captured image, the quality of the captured image deteriorates and the acquired marker pose may not be reliable.

In a case in which the IMU orientation $q^{s2w}_k$ is poor or a case in which the marker pose is not reliable, the value of Q (data) is small. For example, a data pair included in a measurement data group for a view is not reliable in a case in which an angle different is not sufficiently large or a case in which a time difference is considerably large.

For example, Q (data) can be defined in the following equation.

$$Q(data) = a*Stdev(IMU_{data})/C_{IMU} + b*AngleMarkerPose(data)/C_{AngleMarkerPose} + c*AngleIMU(data)/C_{AngleIMU} \quad (n)$$

Here, a, b, and c are weighting coefficients. Stdev ($IMU_{data}$) is a standard deviation of the IMU orientation $q^{s2w}{}_k$ and measures stability of the IMU orientation $q^{s2w}{}_k$. AngleMarkerPose (data) is an angle between two marker poses. This angle is acquired from two captured images included in the data pair. AngleIMU (data) is an angle between two IMU orientations $q^{s2w}{}_k$. $C_{IMU}$, $C_{AngleMarkerPose}$, and $C_{AngleIMU}$ are normalization constants.

After S640, it is determined whether Q (data) is greater than a threshold Qth (S650). In a case in which Q (data) is equal to or less than the threshold Qth (NO in S650), the process returns to S620. In this case, the pair of acquired data is discarded.

In a case in which Q (data) is greater than the threshold Qth (YES in S650), Q (data) is good, and thus the data is inserted into a corresponding field of view (S660). That is, the marker pose and the IMU orientation $q^{s2w}{}_k$ are stored in association with the corresponding view. Then, the color of the dot is changed as described with FIG. 10 (S670). That is, a hemisphere portion indicating a view range of the collected data is marked.

Subsequently, it is determined whether the measurement is completed on all of the views (S680). In a case in which the measurement is not completed on all of the views (NO in S680), the process returns to S610. In a case in which the measurement is completed on all of the views (YES in S680), the data collection process ends and the calculation process is performed (S700).

The calculation process according to the embodiment is configured to include a plurality of calculations and will be described without using a flowchart. In the calculation process according to the embodiment, optimization is performed to reduce an error of the calibration by defining a nonlinear cost function and minimizing the defined cost function. An energy function using the Gauss-Newton method is used as the cost function. A cost function E used in the Gauss-Newton method is expressed in the following equation using e of Equation (m).

$$E = \sum_{i=1}^{M} \{e_i(r)\}^2 \quad (2)$$

This method is started from an initial estimated value and is progressed by iterative calculation by the following equation.

$$r^n = r^{n-1} + \Delta r \quad (o)$$

Here, the increment $\Delta r$ is a solution of a normal equation.

In Equation (2), e is expressed in the following equation using a Jacobian matrix $J_r$ of e.

$$e = -J_r \Delta r \quad (p)$$

The Jacobian matrix $J_r$ is a function of r, and therefore can be described as J(r) as follows.

$$J_r = J(r) = \partial e / \partial r \quad (q)$$

In order minimize a sum of squares of the Gauss-Newton method, the following equation may be solved.

$$\min \|e + J_r \Delta r\| \quad (r)$$

The increment $\Delta r$ is calculated by the following equation.

$$\Delta r = -(J_r^T J_r)^{-1} J_r^T e \quad (s)$$

One of the purposes of the embodiment is to estimate the rotational matrix $R_{cam2imu}$. The rotational matrix can generally be expressed using Eulerian angles. Specifically, the rotational matrix is expressed in the following equation.

$$R = Rz(\gamma) * Ry(\beta) * Rx(\alpha) \quad (t)$$

$$Rx = \begin{bmatrix} 1 & 0 & 0 \\ 0 & \cos\alpha & -\sin\alpha \\ 0 & \sin\alpha & \cos\alpha \end{bmatrix}, \quad (3)$$

$$Ry = \begin{bmatrix} \cos\beta & 0 & \sin\beta \\ 0 & 1 & 0 \\ -\sin\beta & 0 & \cos\beta \end{bmatrix},$$

$$Rz = \begin{bmatrix} \cos\gamma & -\sin\gamma & 0 \\ \sin\gamma & \cos\gamma & 0 \\ 0 & 0 & 1 \end{bmatrix}$$

As a result, $R_{cam2imu}$ is expressed in the following equation.

$$R_{cam2imu} = Rz(\gamma) * Ry(\beta) * Rx(\alpha) \quad (u)$$

In the embodiment, an unknown r is defined from Equation (u) in the following equation.

$$r = [\alpha, \beta, \gamma] \quad (v)$$

Accordingly, Equation (q) can be expressed as follow.

$$J(r) = [\partial e/\partial \alpha, \partial e/\partial \beta, \partial e/\partial \gamma] \quad (w)$$

Accordingly, optimum $R_{cam2imu}$ can be decided by optimizing r.

Equation (q) can be modified into the following equation.

$$J(r) = \left[\frac{\partial E}{\partial r}\right] = \begin{bmatrix} \frac{\partial e_1}{\partial r} \\ \frac{\partial e_2}{\partial r} \\ \vdots \\ \frac{\partial e_i}{\partial r} \\ \vdots \\ \frac{\partial e_M}{\partial r} \end{bmatrix} \quad (4\text{-}1)$$

$$\left[\frac{\partial e_i}{\partial r}\right] = \frac{\partial}{\partial r}(\text{acos}(\text{trace}(R_{camA2B}^{Obs} * (R_{camA2B}^{Pred})') - 1) * 0.5) \quad (4\text{-}2)$$

Incidentally, differential of a composite function of an arc cosine is generally expressed in the following equation.

$$\frac{\partial}{\partial r} \text{acos}(x) = \frac{-1}{\sqrt{1-x^2}} \cdot \frac{\partial x}{\partial r} \quad (5)$$

Here, when x is defined in the following equation, Equation (5) is equal to the double of Equation (4-2). The reason why Equation (5) is doubled is that *0.5 included in Equation (4-2) is ignored. Even when the constant factor (*0.5) is ignored, there is no influence on the optimization of r. Therefore, *0.5 is ignored below.

$$x = (\text{trace}(R_{CamAtoB}^{Obs} * (R_{CamAtoB}^{Pred})') - 1) * 0.5 \quad (6)$$

$R_{camA2B}^{Obs}$ is not a function of r. Accordingly, $\partial x/\partial r$ included in Equation (5) becomes the following equation from Equation (6).

$$\frac{\partial x}{\partial r} = \text{trace}\left(R_{camA2B}^{Obs} * \left(\frac{\partial R_{camA2B}^{Pred}}{\partial r}\right)'\right) \quad (7)$$

Partial differential included in the right side of Equation (7) becomes the following equation from Equation (d). In the following equation and Equations (12), (13), and (14) to be described below, $R_{cam2imu}^{-1}$ is the same matrix as $R_{cam2imu}{}'$, $R_{cam2imu}^{-1}$ is an inverse matrix of $R_{cam2imu}$, and $R_{cam2imu}{}'$ is a transposed matrix of $R_{cam2imu}$.

$$\frac{\partial R_{camA2B}^{Pred}}{\partial r} = \frac{\partial}{\partial r}(R_{cam2imu}^{-1} R_{imuA2B} R_{cam2imu}) \quad (8)$$

$$= \frac{\partial R_{cam2imu}^{-1}}{\partial r} R_{imuA2B} R_{cam2imu} +$$

$$R_{cam2imu}^{-1} R_{imuA2B} \frac{\partial R_{cam2imu}}{\partial r}$$

$\partial R_{cam2imu}/\partial r$ included in Equation (8) is expressed in the following equation from Equation (u).

$$\partial R_{cam2imu}/\partial r = \partial\{Rz(\gamma)*Ry(\beta)*Rx(\alpha)\}/\partial r \quad (x)$$

In regard to the previous equation, α included in r is expressed in the following equation.

$$\partial R_{cam2imu}/\partial \alpha = Rz(\gamma)*Ry(\beta)*\partial\{Rx(\alpha)\}/\partial \alpha \quad (y)$$

$\partial\{Rx(\alpha)\}/\partial \alpha$ included in the previous equation is expressed in the following equation from Equation (3).

$$\frac{\partial}{\partial \alpha} Rx(\alpha) = \begin{bmatrix} 1 & 0 & 0 \\ 0 & -\sin\alpha & -\cos\alpha \\ 0 & \cos\alpha & -\sin\alpha \end{bmatrix} \quad (9)$$

β included in r is expressed in the following equation.

$$\partial R_{cam2imu}/\partial \beta = Rz(\gamma)*\partial\{Ry(\beta)\}/\partial \beta *Rx(\alpha) \quad (z)$$

$\partial\{Ry(\beta)\}/\partial \beta$ included in the previous equation is expressed in the following equation from Equation (3).

$$\frac{\partial}{\partial \beta} Ry(\beta) = \begin{bmatrix} -\sin\beta & 0 & \cos\beta \\ 0 & 0 & 0 \\ -\cos\beta & 0 & -\sin\beta \end{bmatrix} \quad (10)$$

γ included in r is expressed in the following equation.

$$\partial R_{cam2imu}/\partial \gamma = \partial\{Rz(\gamma)\}/\partial \gamma *Ry(\beta)\beta *Rx(\alpha) \quad (aa)$$

$\partial\{Rz(\gamma)\}/\partial \gamma$ included in the previous equation is expressed in the following equation from Equation (3).

$$\frac{\partial}{\partial \gamma} Rz(\gamma) = \begin{bmatrix} -\sin\gamma & -\cos\gamma & 0 \\ \cos\gamma & -\sin\gamma & 0 \\ 0 & 0 & 0 \end{bmatrix} \quad (11)$$

The following equation is established from Equations (4-2), (5), (6), and (7).

$$\frac{\partial e}{\partial \alpha} = \frac{-1}{\sqrt{1-x^2}} * \text{trace}\left\{R_{camA2B}^{Obs} * \left(\frac{\partial R_{cam2imu}^{-1}}{\partial \alpha} R_{imuA2B} R_{cam2imu}\right)' + \right. \quad (12)$$

$$\left. R_{camA2B}^{Obs} * \left(R_{cam2imu}^{-1} R_{imuA2B} \frac{\partial R_{cam2imu}}{\partial \alpha}\right)'\right\}$$

$\partial R_{com2imu}/\partial \alpha$ is calculated by Equations (y) and (9). Further, the cases of β and γ are the same as the case of α, as will be indicated below. $\partial R_{com2imu}/\partial \beta$ is calculated by Equations (z) and (10). $\partial R_{com2imu}/\partial \gamma$ is calculated by Equations (aa) and (11).

$$\frac{\partial e}{\partial \beta} = \frac{-1}{\sqrt{1-x^2}} * \text{trace}\left\{R_{camA2B}^{Obs} * \left(\frac{\partial R_{cam2imu}^{-1}}{\partial \beta} R_{imuA2B} R_{cam2imu}\right)' + \right. \quad (13)$$

$$\left. R_{camA2B}^{Obs} * \left(R_{cam2imu}^{-1} R_{imuA2B} \frac{\partial R_{cam2imu}}{\partial \beta}\right)'\right\}$$

$$\frac{\partial e}{\partial \gamma} = \frac{-1}{\sqrt{1-x^2}} * \text{trace}\left\{R_{camA2B}^{Obs} * \left(\frac{\partial R_{cam2imu}^{-1}}{\partial \gamma} R_{imuA2B} R_{cam2imu}\right)' + \right. \quad (14)$$

$$\left. R_{camA2B}^{Obs} * \left(R_{cam2imu}^{-1} R_{imuA2B} \frac{\partial R_{cam2imu}}{\partial \gamma}\right)'\right\}$$

As described above, $J_r$ can be calculated from the collected (acquired) data and the initial estimated value of $R_{cam2imu}$, and further Equation (r) can be solved. When Equation (r) is solved, optimum $R_{cam2imu}$ can be decided.

According to the embodiment, a solution related to user-friendly setup available offline is realized for the IMU-camera calibration. In the solution, it is not necessary for a user to align planar targets vertically and the second IMU is not necessary. Instead, the real marker MK is used. In the embodiment, a calibration procedure with an automatic user-friendly guide ensures completion of data collection in all of the operation range.

That is, according to the embodiment, neither a vertically aligned pattern nor the second IMU is not necessary. The user can simply set up and use the method of the embodiment. Further, overall precision is improved by supplying a procedure with a user-friendly guide and reliably collecting data obtained in all of the operation range.

A second embodiment will be described. In the second embodiment, differences from those of the first embodiment will be mainly described. Content which is not particularly described is the same as that of the first embodiment.

Figure 11:
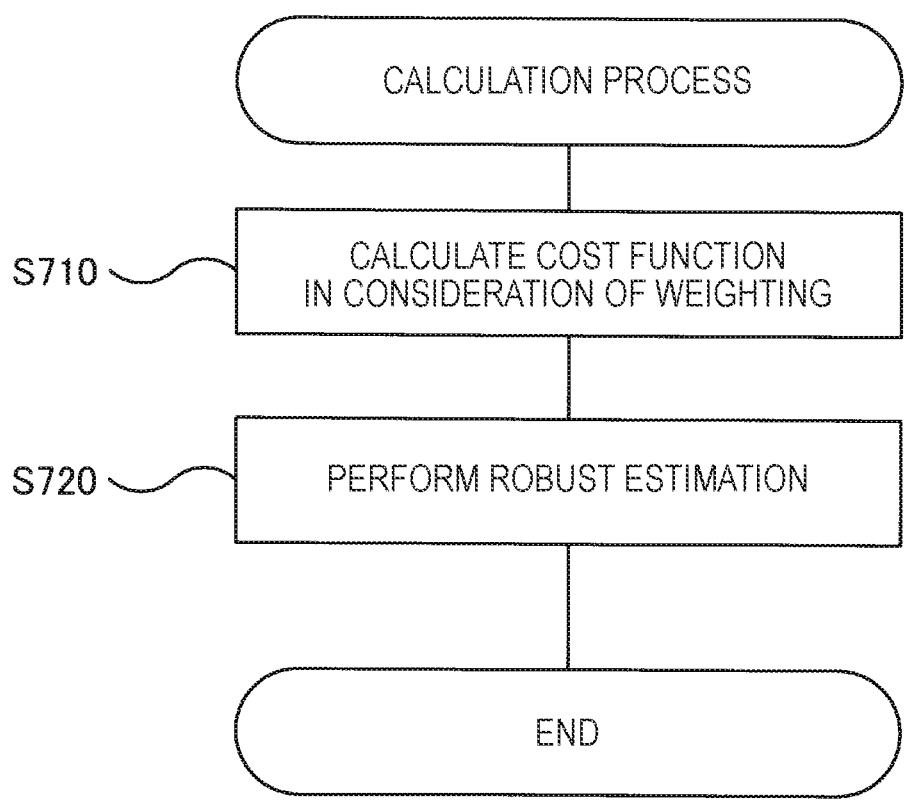
FIG. 11 is a flowchart illustrating a calculation process (second embodiment).

FIG. 11 is a flowchart illustrating a calculation process according to the second embodiment. First, the cost function is calculated in consideration of weighting (S710). Specifically, adaptive weighting scheme or adaptive weighting schema is used. The adaptive weighting scheme can be referred to an adaptive weighting fusing method.

The adaptive weighting scheme will be described. In the data collection process, much data may be collected in a certain view than in other views. However, in a case in which the weightings of pairs of all the data is the same, a view in which much data is collected has a greater influence on an entire result than the other views, and thus may result in an unexpected result.

In the embodiment, the weighting of each pair of data is adjusted based on a view associated with the pair of data. Specifically, in a case in which much data is collected in a certain view, a sum of weighting of the data is the same as the weighting of the view. Thus, the data of the view does not have a considerable influence on the entire calibration result.

Each piece of data has a plurality of weightings (weighting coefficients). The final weightings are automatically fused. In the embodiment, the weightings are fused by fusing a noise level of the IMU 71, a kind of motion, a marker pose, a jitter level, motion blur, a view angle, and a data density of a view.

For example, in i-th data, a weighting $w_{i\_noise}$ is decided in accordance with a noise level of the IMU 71. In a case in which the noise of the IMU 71 is large, the weighting further decreases. A weighting $w_{i\_jitter}$ is decided in accordance with jitter. In a case in which the noise of the jitter is large, the weighting further decreases. As another form, another fusing method may be examined. For example, the simplest method is a method of multiplying all the weightings. A method of a training base can also be applied.

A cost function in which the weighting coefficient is considered is expressed in the following equation. In the following equation, n is a total number of the collected data pairs and $w_i$ is a weighting coefficient. Further, $e_i$ has been described in the first embodiment.

$$E = \sum_{i=1}^{n} w_i \text{trace}(R_{camA2B}^{Obs}, R_{camA2B}^{Pred}) = \sum_{i=1}^{n} w_i e_i \quad (15)$$

Finally, robust estimation is performed (S720). That is, a certain rotational matrix $R_{cam2imu}$ is calculated with an IMU-camera parameter using a robust estimator (robust estimation amount). In the embodiment, M estimation is adopted as the robust estimation. In the robust estimation, an influence of data (outlier) considerably deviated from other data on an estimated amount becomes small. The robust estimation is known, and thus the detailed description of the robust estimation will be omitted.

In the embodiment, an influence of an outlier sample can be gradually reduced using the adaptive weighting fusing method and an M estimator.

A third embodiment will be described. In the third embodiment, differences from those of the second embodiment will be mainly described. Content which is not particularly described is the same as that of the second embodiment.

In a case in which the control section 10 is placed on a horizontal table or a vertical wall, the real marker MK is disposed horizontally or vertically. Therefore, a cost function is modified in the following equation.

$$E = \sum_{i=1}^{n} [\alpha * w_i \text{trace}(R_{camA2B}^{Obs}, R_{camA2B}^{Pred}) + \beta * w_i \quad (16)$$
$$\{1 - \cos(\theta_{i1}(V_{i1imu}, V_{i1marker})) + 1 - \cos(\theta_{i2}(V_{i2imu}, V_{i2marker}))\}]$$

In Equation (16), $V_{i1IMU}$ and $V_{i2IMU}$ are vertical measured values (vectors) by the IMU 71. Here, i indicates an i-th data pair and include measurements (i1 and i2) of two positions. $V_{i1marker}$ and $V_{i2marker}$ are corresponding measured values (vectors) by the camera 60, are derived from vanishing points of a certain scene, and can be calculated from a marker pose. $\theta_{i1}$ is an angle between the two vectors $V_{i1IMU}$ and $V_{i1Marker}$. $\alpha$ and $\beta$ are weighting coefficients. $\alpha + \beta = 1$ is satisfied.

In a case in which the marker is not present on a horizontal surface or a vertical surface, $\beta$ is set to zero and $\alpha$ is set to 1. In this case, Equation (16) becomes the same as Equation (15).

The invention is not limited to the embodiments, examples, and modification examples of the present specification, but can be realized with various configurations within the scope of the invention without departing from the gist of the invention. For example, technical features in the embodiments, examples, and modification examples corresponding to the technical features of the aspects described in the summary of the invention can be appropriately replaced or combined to resolve some or all of the above-described problems or to achieve some or all of the above-described advantages. The technical features can be appropriately deleted unless described as essential features in the present specification. For example, the followings can be exemplified.

The device to which the technology disclosed as an embodiment is applied may be an imaging device other than an HMD. For example, the device may be an imaging device that has no function of displaying an image.

A relative position of the camera to the IMU may be fixed or a relative position of the camera to an image display section may be fixed.

The real marker may not be installed in the control section. For example, the marker may be formed as a separate accessory from the HMD.

In the foregoing embodiments, some or all of the functions and the processes realized by software may be realized by hardware. Some or all of the functions and the processes realized by hardware may be realized by software. For example, various circuits such as integrated circuits, discrete circuits, and circuit modules in which such circuits are combined may be used as hardware.

The entire disclosure of Japanese Patent Application No. 2016-118947 filed on Jun. 15, 2016, is expressly incorporated by reference herein.

What is claimed is:

1. A non-transitory storage medium containing program instructions that, when executed by a computer processor, cause the computer processor to perform a method, the method comprising:
   acquiring a first image and a second image that are captured by imaging a real marker with a camera when an inertial sensor is respectively at a first pose and a second pose, the camera and the inertial sensor being included in a head-mounted display device;
   acquiring a difference in pose between the first pose and the second pose based on output of the inertial sensor; and
   deriving a spatial relationship between the camera and the inertial sensor using at least the first image, the second image and the difference in pose, wherein the spatial relationship is derived by:
      calculating a rotational relationship between the camera and the real marker using the first image and the second image, and
      calculating a rotational matrix using the calculated rotational relationship and the difference in pose such that the rotational matrix is used to convert a coordinate system fixed to the camera into a coordinate system fixed to the inertial sensor.

2. The non-transitory storage medium according to claim 1,
   wherein the head-mounted display device includes a first base portion and a second base portion, the camera is fixed with respect to the first base portion, and the inertial sensor is fixed to the second base portion, so that at least one of the camera and the inertial sensor rotates with respect to one another.

3. The non-transitory storage medium according to claim 1,
wherein the head-mounted display device further includes a display section that displays an image, and
wherein at least one of the camera and the display section is movable with respect to one another.

4. A head-mounted display device comprising:
a camera;
an inertial sensor, and
a processor,
wherein the processor is configured to act:
acquiring a first image and a second image that are captured by imaging a first real marker with the camera when the inertial sensor is respectively at a first pose and a second pose;
acquiring a difference in pose between the first pose and the second pose based on output of the inertial sensor, and
deriving a spatial relationship between the camera and the inertial sensor based at least on the first image, the second image and the difference in pose, wherein the spatial relationship is derived by:
calculating a rotational relationship between the camera and the real marker using the first image and the second image, and
calculating a rotational matrix using the calculated rotational relationship and the difference in pose such that the rotational matrix is used to convert a coordinate system fixed to the camera into a coordinate system fixed to the inertial sensor.

5. A method of calibration for a head-mounted display device including a camera, an inertial sensor and a processor,
the method comprising steps of:
acquiring a first image and a second image that are captured by imaging a first real marker with the camera when the inertial sensor is respectively at a first pose and a second pose;
acquiring a difference in pose between the first pose and the second pose based on output of the inertial sensor, and
deriving a spatial relationship between the camera and the inertial sensor based at least on the first image, the second image and the difference in pose, wherein the spatial relationship is derived by:
calculating a rotational relationship between the camera and the real marker using the first image and the second image, and
calculating a rotational matrix using the calculated rotational relationship and the difference in pose such that the rotational matrix is used to convert a coordinate system fixed to the camera into a coordinate system fixed to the inertial sensor.

* * * * *